US006466917B1

(12) United States Patent
Goyal et al.

(10) Patent No.: US 6,466,917 B1
(45) Date of Patent: Oct. 15, 2002

(54) METHOD AND APPARATUS FOR VERIFYING THE IDENTITY OF A PARTICIPANT WITHIN AN ON-LINE AUCTION ENVIRONMENT

(75) Inventors: Anoop Goyal, East Palo Alto, CA (US); Alex D. Poon, Los Altos Hills, CA (US); Wen Wen, Cupertino, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 09/522,253

(22) Filed: Mar. 9, 2000

Related U.S. Application Data

(60) Provisional application No. 60/168,842, filed on Dec. 3, 1999.

(51) Int. Cl.$^7$ .......................... G06F 17/60

(52) U.S. Cl. .......................... 705/18

(58) Field of Search .......................... 705/18

(56) References Cited

U.S. PATENT DOCUMENTS 3,573,747 A 4/1971 Adams et al.
3,581,072 A 5/1971 Nymayer (List continued on next page.)

FOREIGN PATENT DOCUMENTS

| | | | |
|---|---|---|---|
| CA | 2253543 | | 3/1997 |
| FR | 2658635 | A1 | 2/1991 |
| NL | 9300266 | | 2/1993 |
| WO | WO 92/15174 | | 2/1992 |
| WO | WO 96/34356 | | 4/1996 |
| WO | WO 97/37315 | | 3/1997 |
| WO | WO 99/63461 | A1 | 12/1999 |
| WO | PCT/US01/12398 | | 8/2001 |

OTHER PUBLICATIONS

Business Editors, "Mediappraise: Mediappraise Receives National Award for Web–Based Technology That Enables Companies to Solve Thorny HR Problems," Dec. 14, 1998, 2 pgs., www.businesswire.com.

Business Editors/Computer Writers, "Onsale: Onsale Brings Thrill of Auctions and Bargain Hunting Online; Unique Internet Retail Service Debuts With Week–Long Charity Auction For The Computer Museum in Boston," May 24, 1995, 3 pgs., http:/ /www.dialogweb.com/cgi/ dwclient?d-wcommand=DWEBPRINT%20810–489267.

Meade, J., "Visual 360: A Performance Appraisal System That's 'Fun' (Evaluation)," HRMagazine, 44, 7, 2 pgs.,. Jul. 1999, Society for Human Resource Management.

Preist, C., et al., "Adaptive Agents in a Persistent Shout Double Auction," Proceedings, $1^{st}$ Interntational Conf. on Information and Computation Economies, Oct. 25–28, 1998, pp. 11–18, Charleston, N.C.

Resnick, P., et al., "Reputation Systems," Dec. 2000, Assoc. for Computing Machinery, Communications of the ACM, vol. 43, n. 12, 4 pgs.

(List continued on next page.)

*Primary Examiner*—Kenneth R. Rice
(74) *Attorney, Agent, or Firm*—Blakely, Sokoloff, Taylor & Zafman LLP

(57) ABSTRACT

A method and apparatus for verifying identity of a participant in a network-based transaction facility are described. According to one embodiment, user interface information is provided to the participant via a communications network. The user interface information specifies an identity verification interface for obtaining personal information of the participant. The personal information of the participant is passed to a third party for verification via the communications network. Subsequently, a verification result is received from the third party via the communications network. The verification result is then communicated to the participant via the communications network.

18 Claims, 13 Drawing Sheets

U.S. PATENT DOCUMENTS

| | | | | |
|---|---|---|---|---|
| 4,412,287 | A | 10/1983 | Braddock, III | |
| 4,674,044 | A | 6/1987 | Kalmus et al. | |
| 4,677,552 | A | 6/1987 | Sibley, Jr. | |
| 4,789,928 | A | 12/1988 | Fujisaki | |
| 4,799,156 | A | 1/1989 | Shavit et al. | |
| 4,823,265 | A | 4/1989 | Nelson | |
| 4,864,516 | A | 9/1989 | Gaither et al. | |
| 4,903,201 | A | 2/1990 | Wagner | |
| 5,063,507 | A | 11/1991 | Lindsey et al. | |
| 5,077,665 | A | 12/1991 | Sliverman et al. | |
| 5,101,353 | A | 3/1992 | Lupien et al. | |
| 5,136,501 | A | 8/1992 | Silverman et al. | |
| 5,168,446 | A | 12/1992 | Wiseman | |
| 5,205,200 | A | 4/1993 | Wright | |
| 5,243,515 | A | 9/1993 | Lee | |
| 5,258,908 | A | 11/1993 | Hartheimer et al. | |
| 5,280,422 | A | 1/1994 | Moe et al. | |
| 5,297,031 | A | 3/1994 | Gutterman et al. | |
| 5,297,032 | A | 3/1994 | Trojan et al. | |
| 5,305,200 | A | 4/1994 | Hartheimer et al. | |
| 5,325,297 | A | 6/1994 | Bird et al. | |
| 5,329,589 | A | 7/1994 | Fraser et al. | |
| 5,375,055 | A | 12/1994 | Togher et al. | |
| 5,394,324 | A | 2/1995 | Clearwater | |
| 5,426,281 | A | 6/1995 | Abecassis | |
| 5,485,510 | A | 1/1996 | Colbert | 379/145 |
| 5,553,145 | A | 9/1996 | Micali | |
| 5,557,728 | A | 9/1996 | Garrett et al. | |
| 5,598,557 | A | 1/1997 | Doner et al. | |
| 5,640,569 | A | 6/1997 | Miller et al. | |
| 5,657,389 | A | 8/1997 | Houvener | 380/23 |
| 5,664,115 | A | 9/1997 | Fraser | |
| 5,689,652 | A | 11/1997 | Lupien et al. | |
| 5,694,546 | A | 12/1997 | Reisman | |
| 5,706,457 | A | 1/1998 | Dwyer et al. | |
| 5,710,889 | A | 1/1998 | Clark et al. | |
| 5,715,314 | A | 2/1998 | Payne et al. | |
| 5,715,402 | A | 2/1998 | Popolo | |
| 5,717,989 | A | 2/1998 | Tozzoli et al. | |
| 5,719,560 | A | 2/1998 | Watkins | 340/825.34 |
| 5,727,165 | A | 3/1998 | Ordish et al. | |
| 5,771,291 | A | 6/1998 | Newton et al. | 380/25 |
| 5,771,380 | A | 6/1998 | Tanaka et al. | |
| 5,794,219 | A | 8/1998 | Brown | |
| 5,799,285 | A | 8/1998 | Klingman | |
| 5,803,500 | A | 9/1998 | Mossberg | |
| 5,818,914 | A | 10/1998 | Fujisaki | |
| 5,826,244 | A | 10/1998 | Huberman | |
| 5,835,896 | A | 11/1998 | Fisher et al. | |
| 5,845,265 | A | 12/1998 | Woolston | |
| 5,845,266 | A | 12/1998 | Lupien et al. | |
| 5,850,442 | A | 12/1998 | Muftic | |
| 5,872,848 | A | 2/1999 | Romney et al. | 380/25 |
| 5,873,069 | A | 2/1999 | Reuhl et al. | |
| 5,884,056 | A | 3/1999 | Steele | |
| 5,890,138 | A | 3/1999 | Godin et al. | |
| 5,905,974 | A | 5/1999 | Fraser et al. | |
| 5,905,975 | A | 5/1999 | Ausubel | |
| 5,922,074 | A | 7/1999 | Richard et al. | 713/200 |
| 5,926,794 | A | 7/1999 | Fethe | |
| 5,991,739 | A | 11/1999 | Cupps et al. | |
| 6,035,288 | A | 3/2000 | Solomon | |
| 6,035,402 | A | 3/2000 | Vaeth et al. | 713/201 |
| 6,044,363 | A | 3/2000 | Mori et al. | |
| 6,055,518 | A | 4/2000 | Franklin et al. | |
| 6,058,417 | A | 5/2000 | Hess et al. | |
| 6,073,117 | A | 6/2000 | Oyanagi et al. | |
| 6,085,176 | A | 7/2000 | Woolston | |
| 6,104,815 | A | 8/2000 | Alcorn et al. | 380/251 |
| 6,202,051 | B1 | 3/2001 | Woolston | |
| 6,266,651 | B1 | 7/2001 | Woolston | |

OTHER PUBLICATIONS

Malone, TW; Yates, J; et al., "Electrnic Markets and Electronic Hierarchies", *Communications –of the ACM*, Jun. 1987, pp. 484–497, vol. 30, No. 6, USA.

Warbelow, A; Kokuryo, J, "Aucnet: TV Auction Network System". *Harvard Business School Case/Study*, Jul. 1989, pp. 1–15, HBVR# 9–190–001, USA.

"Personal Optimized Decision/Transaction Program", *IBM Technocal Disclosure Bulletin*, Jan. 1995, pp. 83–84, vol. 38, No. 1, USA.

Neo, BS, "The implementation of an electronic market for pig trading in Singapore", *Journal of Strategic Information Systems*, Dec. 1992, pp. 278–288, vol. 1, No. 5.

Rockoff, TE; Groves, M., "Design of an Internet–based system for remote Dutch auctions", *Internet Reaearch – Electrnic Networking Applications and Policy*, Jan. 1, 1995, vol. 5, No. 4, pp. 10–16.

Massimb, MN; Phelps, BD, "Electronic Trading, Market Structure and Liquifity", *Financial Analysts Journal*, Jan. – Feb. 1994, vol. 50, No. 1, pp. 39–50, Charlottesville, Virginia.

Post, DL; Coppinger, SS, et al., "Application of Auctions as a Pricing Mechinism for the Interchange of Electric Power", *IEEE Transactions on Power Systems*, Aug. 1995, pp. 1580–1584, vol. 10, No. 3.

Hess, CM; Kemerer, CF., "Computerized Loan Organization System: An Industry Case Study of the Electronic Markets Hypothesis", *MIS Quarterly*, Sep. 1994, vol. 18, No 3, pp. 251–274.

Reck, Martin, "Formally Specifying and Automated Trade Execution System", *Journal of Systems and Software*, 1993, pp. 245–252, vol. 21, Elsevier Science Publishing Co., Inc. New York, Ny.

"Anonymous Delivery of Goods in Electronic Commerce", *IBM Technocal Disclosure Bulletin*, Mar. 1996, pp. 363–366, vol. 39, No. 3.

Lee, G., "Electronic Brokerage and Electronic Auction: The Impact of IT on Market Structures", *Proceedings of the 29th HICSS*, 1996, pp. 397–406, vol. IV.

Clemins, E; Weber, B., "Evaluating the Prospects for Alternative Electronic Securities Markets", *International Conference on Information Systems*, 1991, pp. 53–61, vol 12.

Mardesich, J., "Onsale Takes Auction gavel electronic", *Computer Reseller News*, Jul. 8, 1996, p. 2 continued on p. 32, Mountain View, California.

"Onsale joins fray as online shopping picks up speed: Internet Booms", *Computer Reseller News*, Jun. 5, 1995, p. 73, CMP Publications, Inc., USA.

Siegmann, Ken, "Nowhere to go but up", *PC Week*, Oct. 23, 1995, pp. 1–3, vol. 12, No. 42, Ziff–Davis Publishing Company.

"Onsale: Onsale Brings Thrill of Auctions and Bargain Hunting Online; Unique Internet retail service debuts with week–long charity auction for the Computer Museum in Boston", May 24, 1995, p. 3.

Schmid, BF., "The Development of Electronic Commerce", *Newsletter of the Competence Centre Electrnic Markets*, Oct. 1993, No. 9/10.

Tjostheim, I; Eide, J., "A case study of an on–line auction for the World Wide Web", *Norwegian Computing Center*, No Date Given, pp. 1–10.

Graham, I., "The Emergence of Linked Fish Markets in Europe", *Focus Theme*, No Date Given, pp. 1–4.
Reck, Martin., "Trading–Process Characteristics of Electronic Auctions", *Focus Theme*, No Date Given, pp. 1–7.
Van Heck, E; Ribbers, PM., "Experiences with Electronic Auctions in the Dutch Flower Industry", *Focus Theme*, No Date Given, pp. 1–6.
Lee, HG., "Aucnet: Electronic Intermediary for Used–car Transactions", *Focus Theme*, No Date Given, pp. 1–5.
Klein, S., "Introduction to Electronic Auctions", *Focus Theme*, No Date Given, pp. 1–4.
Turban, E., "Auctions and Bidding on the Internet an Assessment", *Focus Theme*, No Date Given, pp. 1–5.
Zwass, Vladimir., "Electronic Commerce: Structures and Issues", *International Journal of Electrnic Commerce*, Fall 1996, pp. 3–23, vol. 1, No. 1.

METHOD AND APPARATUS FOR VERIFYING THE IDENTITY OF A PARTICIPANT WITHIN AN ON-LINE AUCTION ENVIRONMENT

RELATED APPLICATIONS

This application claims the benefit of U.S. Provisional Application No. 60/168,842 filed Dec. 3, 1999.

FIELD OF THE INVENTION

The present invention relates generally to the field of e-commerce and, more specifically, to verifying the identity of a participant within a network-based transaction facility such as, for example, an Internet-based auction facility.

BACKGROUND OF THE INVENTION

For users of a network-based transaction facility, such as an Internet-based auction facility, verification of user identity is particularly important for enhancing user trust in the transaction facility. Indeed, an assurance that a trader is who he or she claims to be or that a trader has the capacity (e.g. is at least 18 years old) to enter into a transaction may be particularly valuable and useful in providing other traders with a degree of confidence regarding that specific trader. Accordingly, an indication to other traders that the identity of a particular trader is verified by a reliable source may establish the credibility and trustworthiness of this trader within an on-line trading community. Similarly, the absence of such verification may discourage other traders from transacting with this specific trader.

Therefore, it will be advantageous to provide traders with an opportunity to have their identity verified by a reliable source in real time and to make the verification result available to all other traders.

SUMMARY OF THE INVENTION

A method and apparatus for verifying identity of a participant in a network-based transaction facility are described. According to one embodiment, user interface information is provided to the participant via a communications network. The user interface information specifies an identity verification interface for obtaining personal information of the participant. The personal information of the participant is passed to a third party for verification via the communications network. Subsequently, a verification result is received from the third party via the communications network. The verification result is then communicated to the participant via the communications network.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for verifying the identity of a participant in a network-based transaction facility are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Transaction Facility

Figure 1:
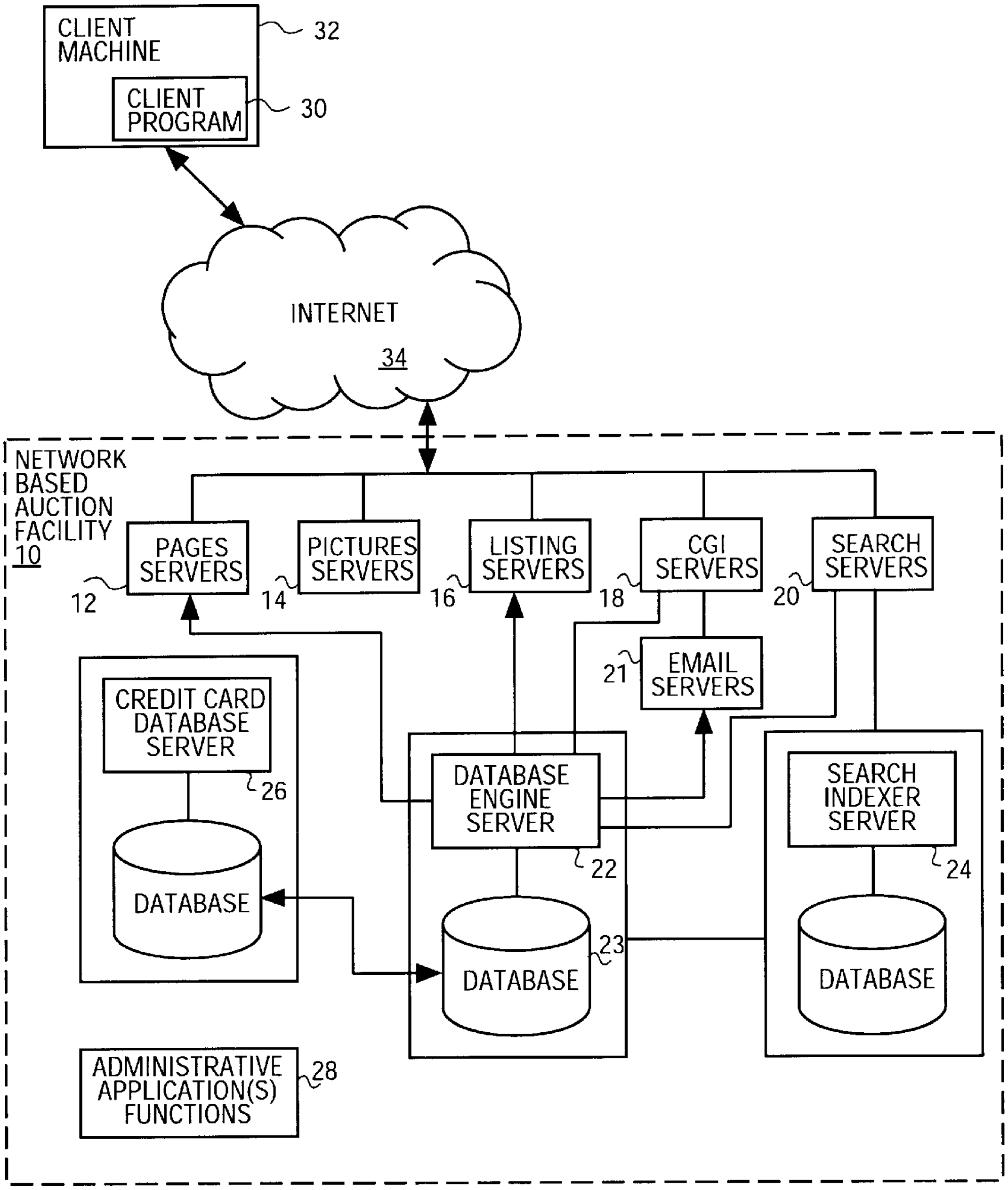
FIG. 1 is a block diagram of one embodiment of a network-based transaction facility.

FIG. 1 is a block diagram illustrating an exemplary network-based transaction facility in the form of an Internet-based auction facility 10. While an exemplary embodiment of the present invention is described within the context of an auction facility, it will be appreciated by those skilled in the art that the invention will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash. that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 2:
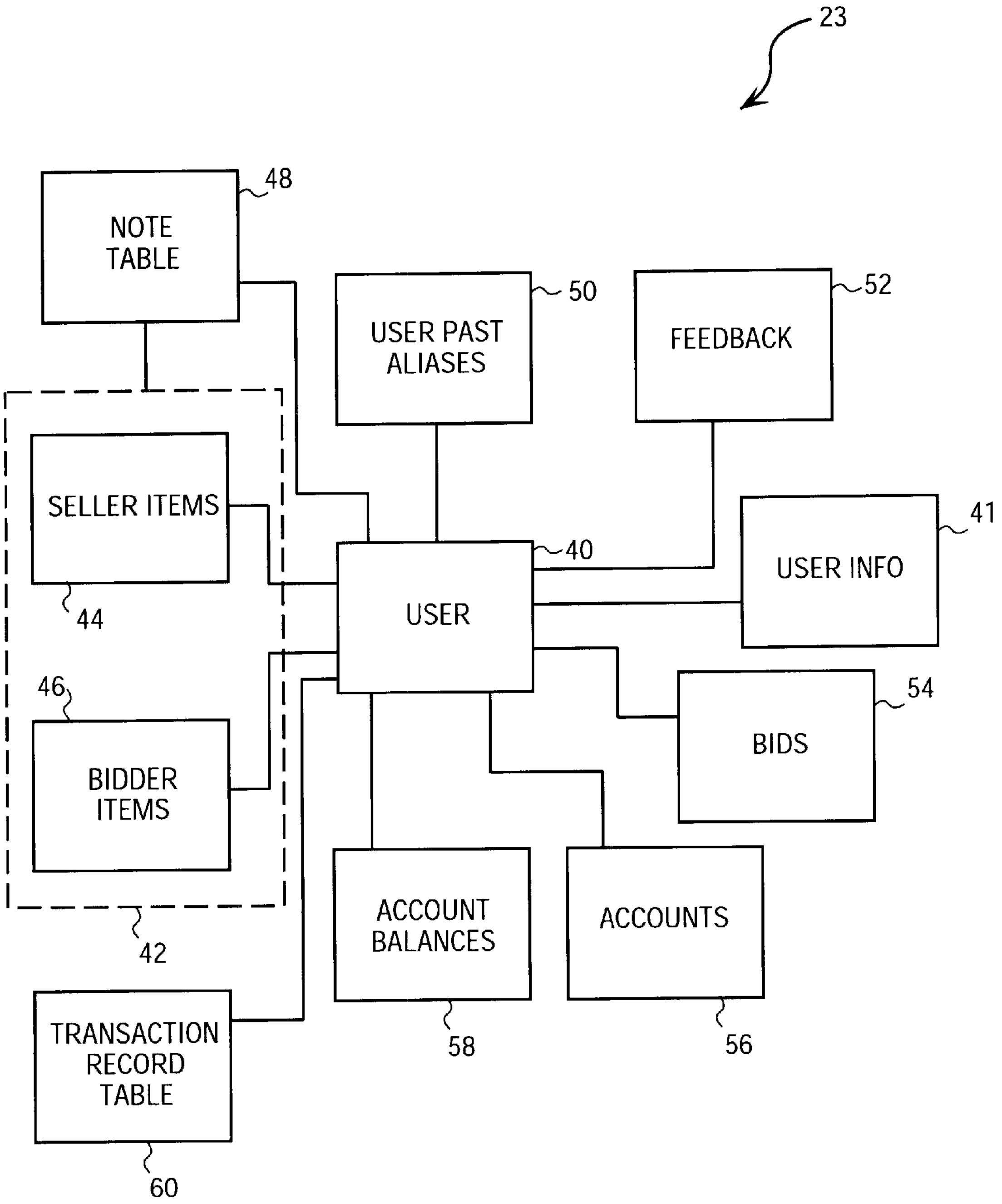
FIG. 2 is a block diagram of one embodiment of a database maintained by a database engine server.

FIG. 2 is a database diagram illustrating an exemplary database 23, maintained by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

Central to the database 23 is a user table 40, which contains a record for each user of the auction facility 10. A user may operate as a seller, buyer, or both, within the auction facility 10. A user information table 41 is linked to the user table 40 and includes more detailed information about each user. The database 23 also includes item tables 42 that may be linked to the user table 40. Specifically, the tables 42 include a seller items table 44 and a bidder items table 46. A user record in the user table 40 may be linked to multiple items that are being, or have been, auctioned via the facility 10. A link indicates whether the user is a seller or a bidder (or buyer) with respect to items for which records exist within the item tables 42. The database 23 also includes a note table 48 populated with note records that may be linked to one or more item records within the item tables 42 and/or to one or more user records within the user table 40. Each note record within the table 48 may include, inter alia, a comment, description, history or other information pertaining to an item being auction via the auction facility 10, or to a user of the auction facility 10.

A number of other tables are also shown to be linked to the user table 40, namely a user past aliases table 50, a feedback table 52, a bids table 54, an accounts table 56, an account balances table 58 and a transaction record table 60.

Figure 3:
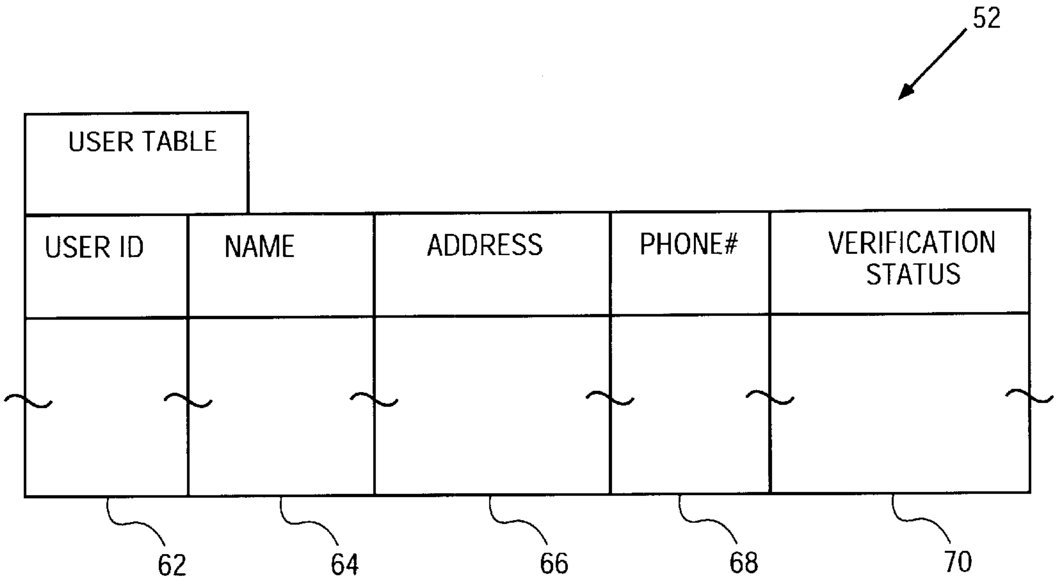
FIG. 3 is a diagrammatic representation of one embodiment of a user table within the database.

FIG. 3 is a diagrammatic representation of an exemplary embodiment of the user table 40 that is populated with records, or entries, for each user of the auction facility 10. The table 40 includes a user identifier column 62 that stores a unique identifier for each user. A name column 64 stores a first name, a middle initial and a last name for each user. An address column 66 stores full address information for each user, e.g. a street name and number, city, zip code, state, etc. A phone number column 68 stores a home phone number for each user. A verification status column 70 stores, for each user, a value identifying the user's status associated with the verification process. That is, different values will be assigned to indicate whether a user passed the verification process, failed the verification process, has never participated in the verification process, has not yet paid a fee required for the verification process, etc.

It will be appreciated that any information other than that described above may populate the user table 40 without loss of generality.

Figure 4:
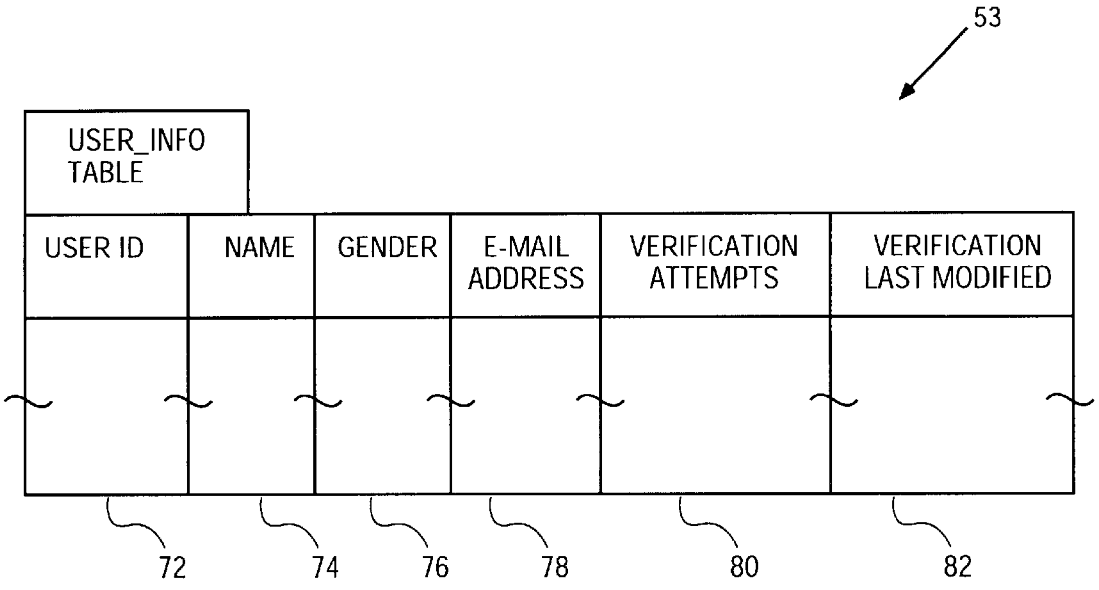
FIG. 4 is a diagrammatic representation of one embodiment of a user information table within the database.

FIG. 4 is a diagrammatic representation of an exemplary embodiment of the user information table 41. The user information table 41 stores detailed information about each user participating in the action facility 10. The table 41 includes a user identifier column 72 that stores, for each entry, a user identifier providing a pointer to the user table 40. A name column 74 stores the full name of each user. A gender column 76 stores the gender of each user. An e-mail address column 78 stores each user's e-mail address. A verification attempts column 80 stores a number which indicates how many times a user participated in the verification process. A verification last modified column 82 stores the date of the most recent modification of the verification status. The verification status for each user is stored in column 70 of the user table 40.

It will be appreciated that other descriptive information may also populate the user information table 41.

Identity Verification Process

In order to increase the level of trust between participants of the auction facility 10, one embodiment of the present invention proposes a method and apparatus whereby a participant is provided with an opportunity to have his or her identity verified and the result of the identification process made available to other participants who wish to know this information. The present invention enables real-time, web-based verification of a participant's identity by a reliable source in one application process. While the present invention is discussed within the environment of the auction facility 10, it will readily be appreciated that the present invention may be extended to providing identity verification in other environments including network-based transaction facilities (e.g., business-to-business, business-to-consumer and consumer-to-consumer Internet marketplaces and retailers) and on-line communities.

Figure 5:
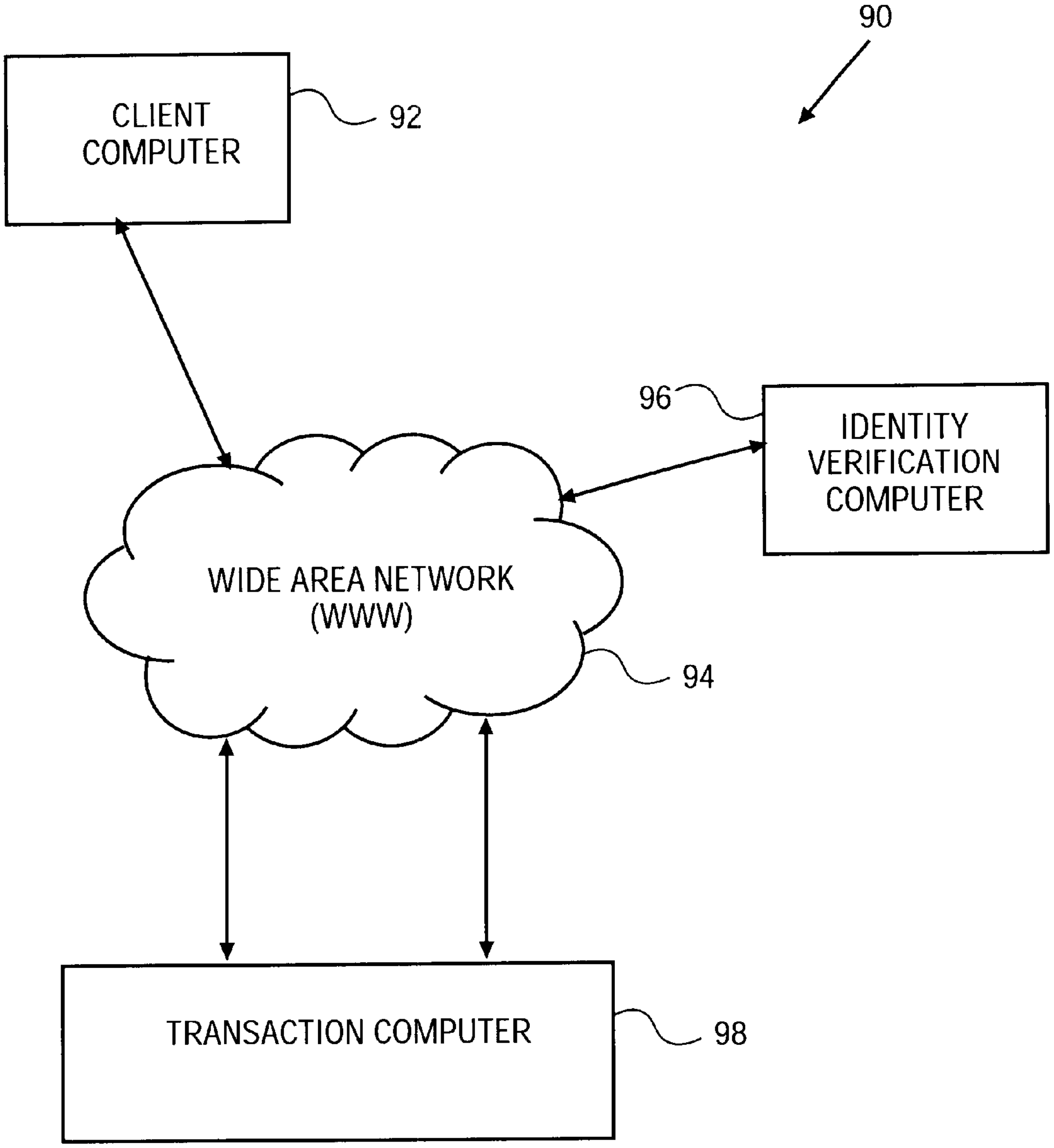
FIG. 5 is a block diagram of one embodiment of a system for verifying the identity of a participant in a transaction facility.

FIG. 5 is a block diagram of a system for verifying the identity of a participant, according to an exemplary embodiment of the present invention, that may be implemented by the auction facility 10. In this embodiment, a client computer 92 is coupled to a transaction computer 98 via a communications network (e.g. a wide area network) 94. The client computer 92 represents a device that allows a user to participate in the auction facility 10 or any other transaction facility. In one embodiment, the client computer 92 presents to the user an identity verification interface for obtaining user personal information. When the client computer 92 receives the user personal information in the manner described below, the client computer 92 transfers this information to the transaction computer 98 over the network 94.

The transaction computer 98, which supports that action facility 10, handles all transactions between various participants of the facility 10 including the user of the client computer 92. The transaction computer 98 is coupled to an identity verification computer 96 via network 94. In one embodiment, the transaction computer 98 receives the personal information of the participant from the client computer 92, and transfers this information to the identity verification computer 96 over the network 94. In this embodiment, the identity verification computer 96 receives the personal information and performs an identity verification process based on the personal information and further questioning of the participant. Upon completion of the identity verification process, the identity verification computer 96 generates a verification result that is transferred back to the transaction computer 98 over the network 94.

The transaction computer 98 receives the verification result and makes it available, via the network 94, to those participants who wish to know this information. In one embodiment, the transaction computer 98 issues an identity verified icon, which is displayed with the participant's identification information.

Figure 6:
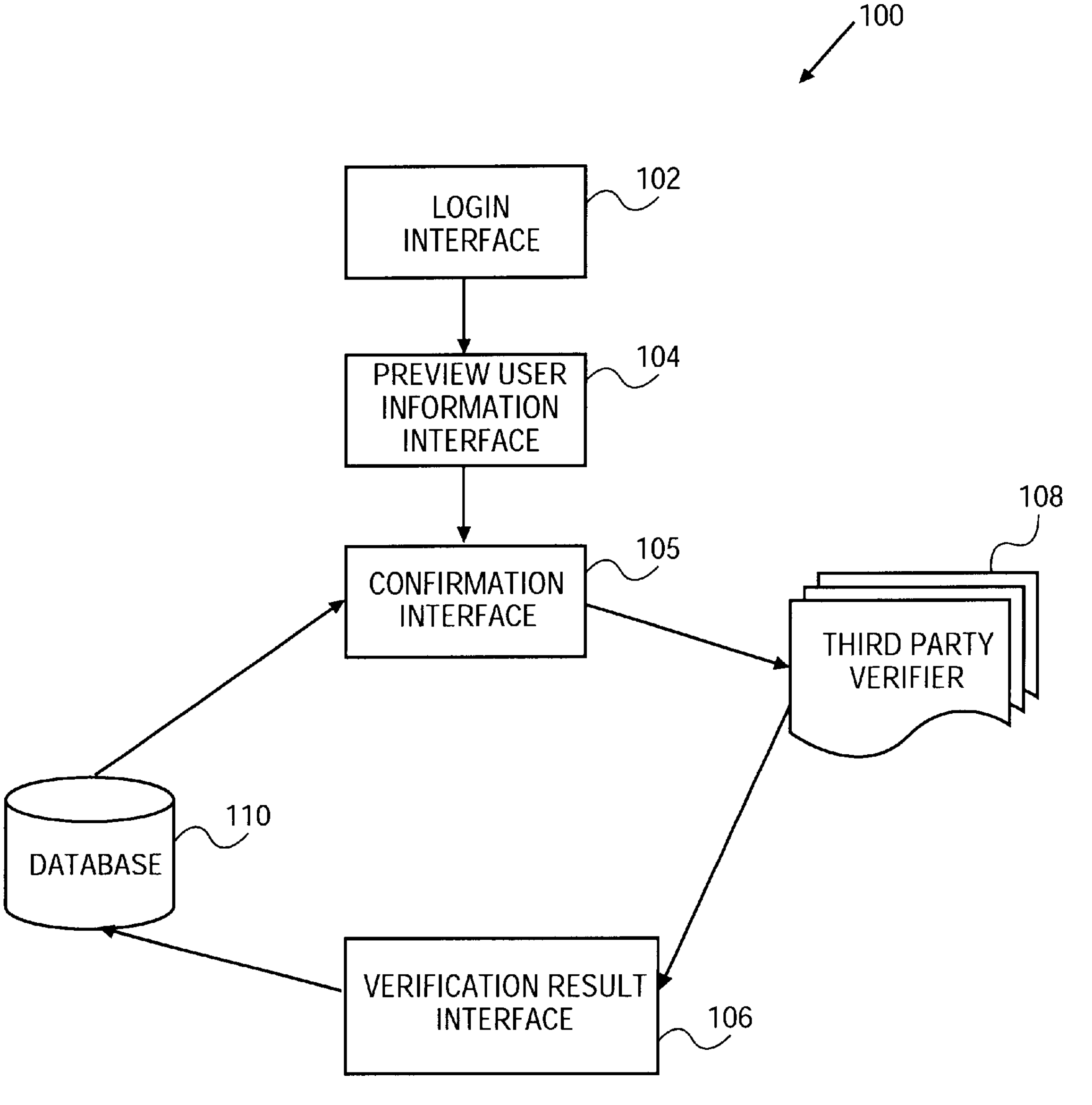
FIG. 6 is a block diagram of one embodiment of an interface sequence implemented to verify the identity of a participant.

FIG. 6 shows an interface sequence 100, according to an exemplary embodiment of the present invention, that may be implemented by the auction facility 10 for the purposes of verifying the identity of a participant in the auction facility 10. The sequence 100 of interfaces shown in FIG. 6 will be described with reference to exemplary representations of the various interfaces included with the sequence 100 are shown in FIGS. 8–11.

The interface sequence 100 commences with a login interface 102, through which a user of the facility 10 provides at least a user identifier and associated password. In one embodiment, the login interface 102 may also provide information explaining the identity verification process and identifying a third party verifier. The user may also be requested to pay a fee for the verification process.

Figure 12:
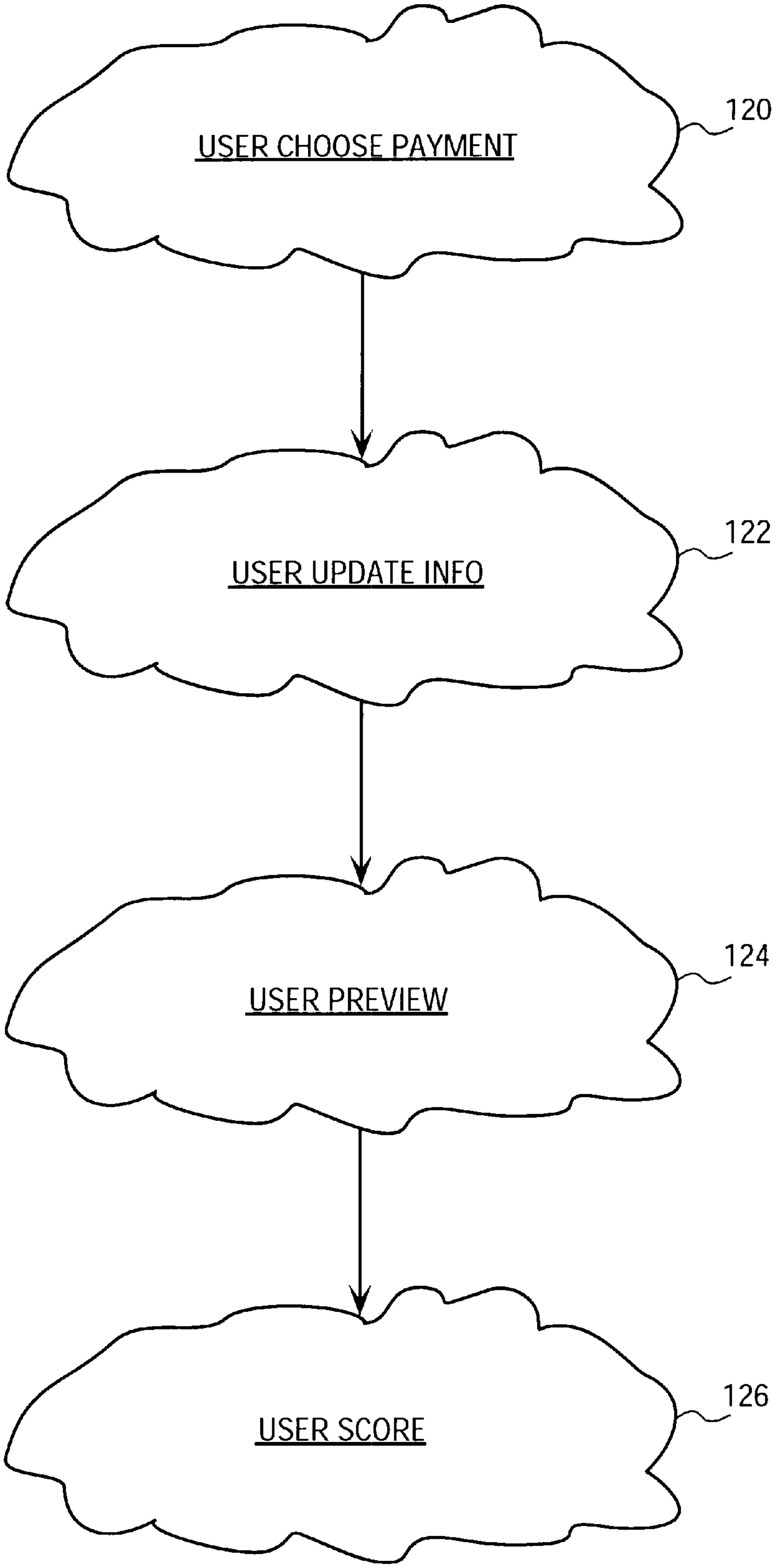
FIG. 12 illustrates one embodiment of a collection of objects that generate the various interfaces shown in FIGS. 8–11.

The interface 102, and subsequent interfaces 104–106, are generated by a collection of objects (or methods), exemplary embodiments of which are illustrated in FIG. 12. Specifically, a login interface 102 is generated by a "UserChoosePayment" object 120. The object 120 may also be responsible for receiving the user's consent to pay a fee for the verification and for confirming that the user is allowed to be verified based on certain criteria. These criteria may include, for example, the user's age (e.g., 18 years or older), country of residence, a limit on the number of attempts to obtain a verification, limitations on using certain web technologies, the user's consent to refrain from modifying the user's personal information after obtaining the verification for a particular period of time (e.g., 30 days), etc.

Returning to FIG. 6, the login interface 102 is followed by a preview user information interface 104. The preview user information interface 104 is generated based on the user's personal information stored in a database 110 (specifically, in the user table 40 and the user information table 41). As illustrated in FIG. 12, the "UserChoosePayment" object 120, upon receiving all requested information, calls a "UserUpdatelnfo" object 122 which accesses the database 110, retrieves the user's personal information, and displays it to the user. An exemplary representation of this interface is shown in FIG. 8.

Figure 8:
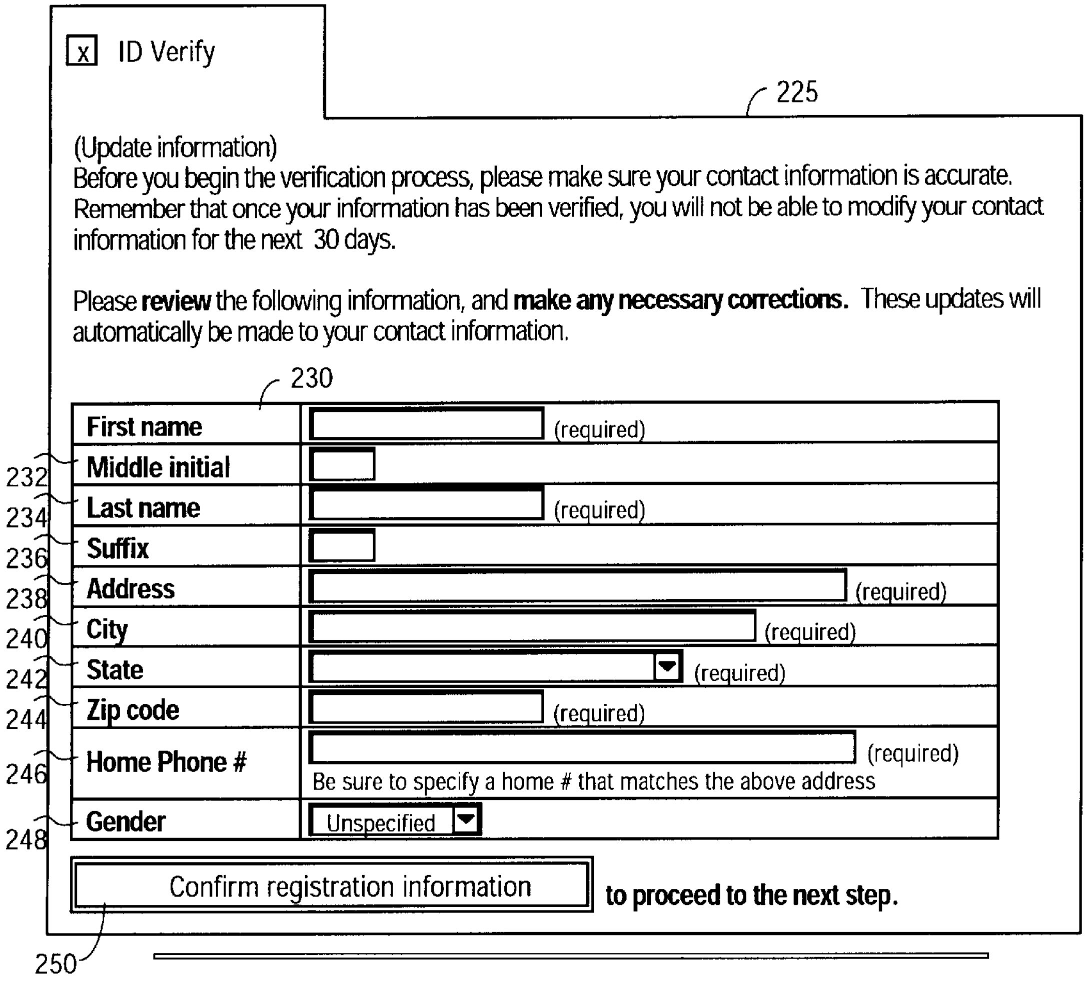
FIGS. 8–11 are exemplary representations of various interfaces included in the sequence of interfaces shown in FIG. 6.

Referring to FIG. 8, the interface 225 provides the user's first name 230, middle initial 232, last name 234 and suffix 236. In addition, the interface 225 provides the user's address 238, city 240, state 242, zip code 244, home phone 246 and gender 248. All the fields are editable and can be changed by the user if incorrect or outdated. After making necessary corrections, the user confirms the information using a confirm button 250.

Returning to FIG. 6, a confirmation interface 105 is displayed to the user subsequent to the preview user information interface 104. The confirmation interface 105 displays the user's personal information (as modified by the user on the preview user information interface 104) to give the user a last chance to modify the personal information before submitting it to a third party verifier 108 according to one embodiment of the present invention.

Figure 9:
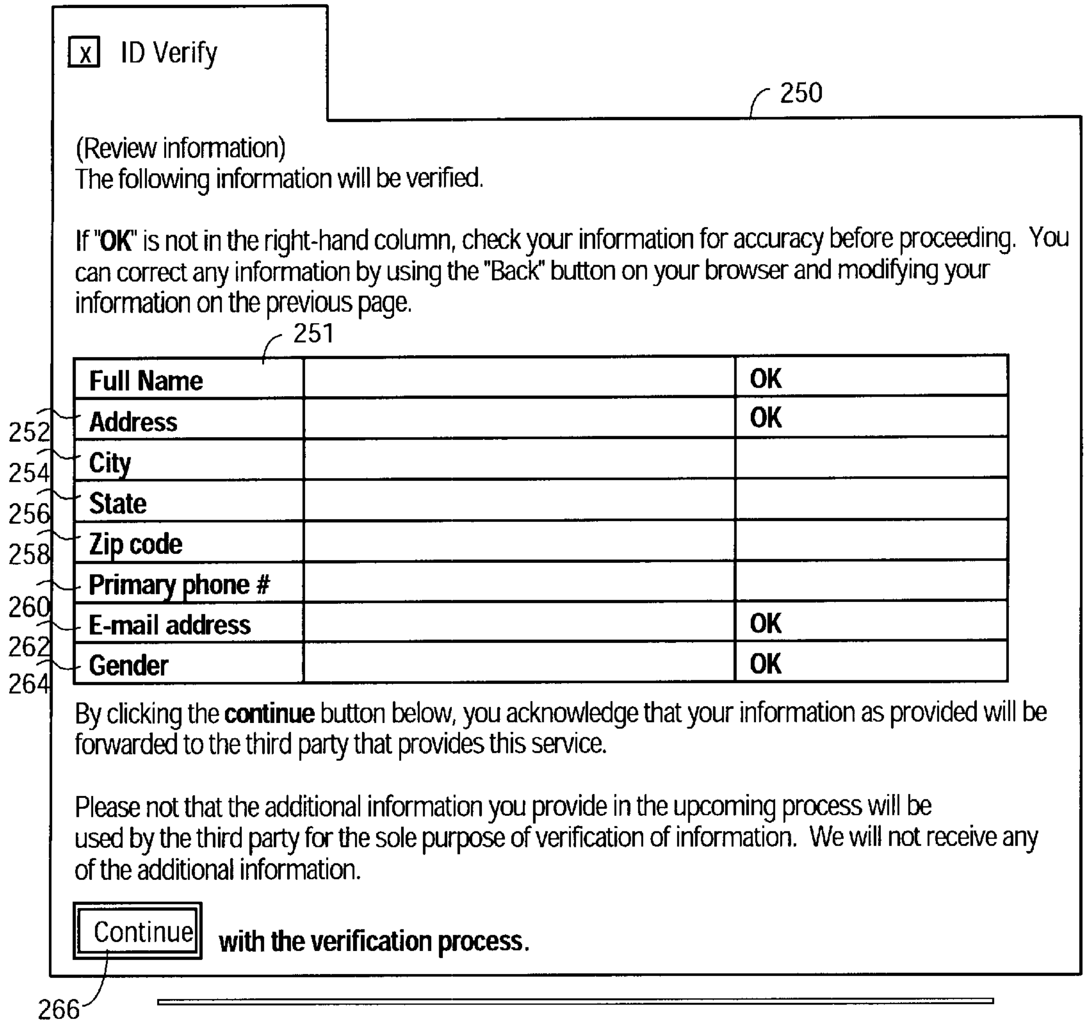

An exemplary representation of the confirmation interface 105 is shown in FIG. 9. The confirmation interface 105 provides a continue button 266. By clicking the continue button 266, the user acknowledges that the personal information displayed in fields 230–264 will be submitted to the third party verifier 108 for the purpose of verifying the identity of the user.

Clicking the continue button 266 invokes a "UserPreview" object 124 shown in FIG. 12. The "UserPreview" object 124 receives the user's personal information and updates the corresponding data in tables 40 and 41 if the user modified any of his or her personal information. In addition, the "UserPreview" object 124 updates the user's verification status field 70 in the user table 40 (e.g., changing the status to "pending") and the verification attempts field 80 in the user information table 41 (e.g., increasing the number of attempts by 1). Further, the "UserPreview" object 124 generates an input set of data to be passed to the third party verifier 108. In one embodiment, the input set of data includes the user's personal information from the confirmation interface 105 and a unique user identifier. The "UserPreview" object 124 is also responsible for encrypting the input set of data for security purposes.

In one embodiment, the third party verifier 108 receives the above encrypted information over a network. Alternatively, the user may decide to select a postal mailing verification system that allows the exchange of information between the user and the third party verifier 108 using a postal service.

If the user selects the online verification method, the third party verifier 108 (e.g., a consumer credit reporting company) displays to the user a list of questions which require knowledge of certain personal information that only the user possesses. Based on the accuracy of user online responses, the third party verifier 108 generates an output set of data which contains the unique user identifier, a verification result and a reason for the verification result. The third party verifier 108 then encrypts the output set of data. In one embodiment, the third party verifier 108 decides whether the user passed or failed the verification process. Alternatively, the auction facility 10 may make a final determination based on the output set of data provided by the third party verifier 108.

If the user chose the postal verification method, the third party verifier 108 receives user's information by mail, analyzes it, and, upon completing the identity verification process of the user, mails a personal identification number (PIN) to the user. The user may then enter the PIN on the requested web site of the third party verifier 108. Once the PIN is entered correctly, the third party verifier 108 passes the encrypted set of data to the auction facility 10 over the network.

When the output set of data is received by the auction facility 10, a "UserScore" object 126 decrypts the output set of data, checks the verification status information in the user table 40 to confirm that the user is currently participating in the verification process (i.e., the user's verification status is pending), and generates a verification result interface 300. The "UserScore" object 126 also updates the user's verification status in the user table 40 based on the verification result. The "UserScore" object 126 is further responsible for applying a fee for the verification process to the user's account if the user successfully passed the verification process.

Figure 10:
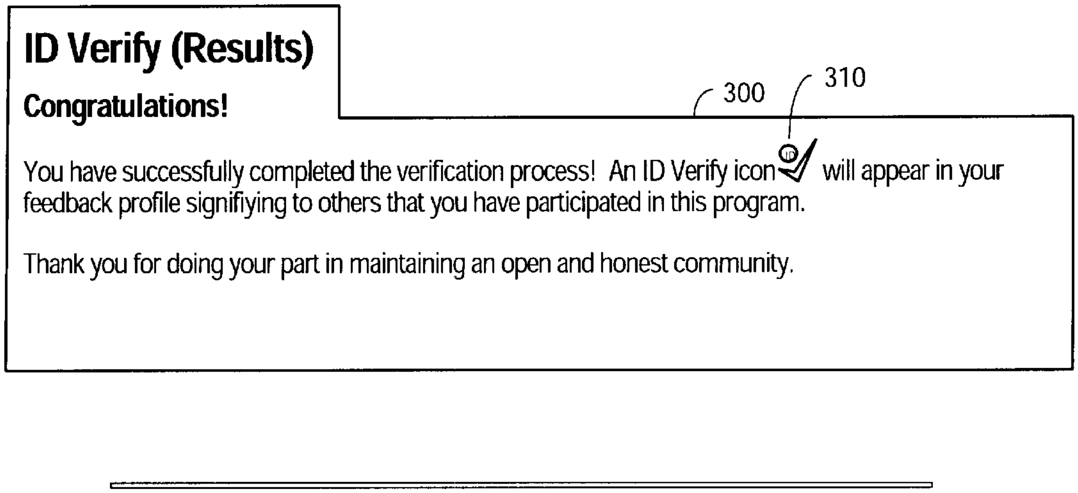

The verification result interface 300 displays either a congratulatory (or confirmation) text or a denial text. An exemplary representation of the verification result interface 300 with a congratulatory text is shown in FIG. 10.

Figure 11:
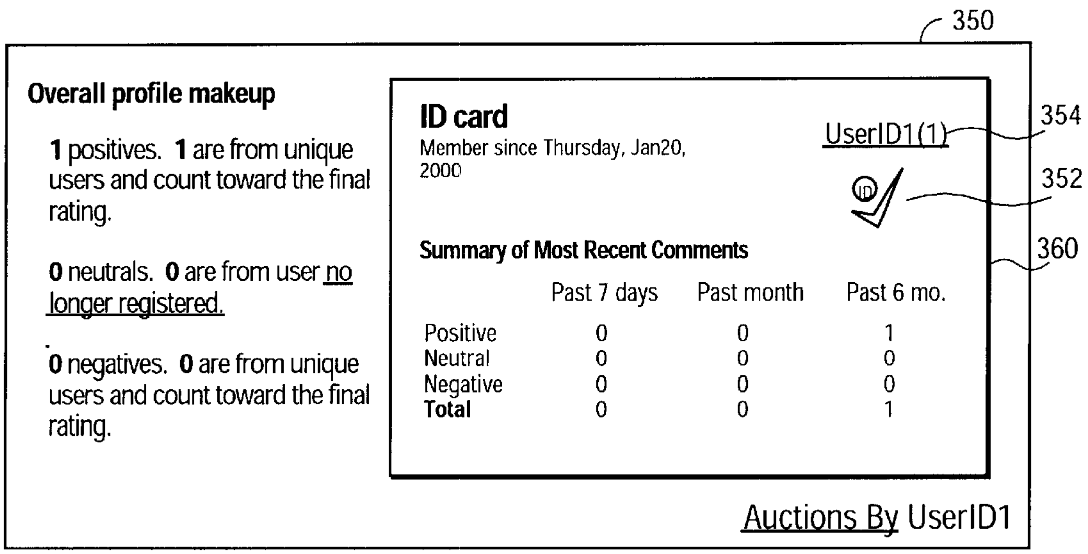

Upon successful completion of the verification process, an icon appears next to the user identification information. In one embodiment, the icon appears in the user's feedback profile. FIG. 11 is an exemplary representation of a feedback profile interface 350. An "ID Verify" icon 352 is displayed with a user identifier 354 and a summary of most recent comments associated with the user. The icon 352 signifies to any participant of the auction facility 10, who requested feedback profile information about this user, that the user participated in the verification process and successfully passed it.

Figure 7A:
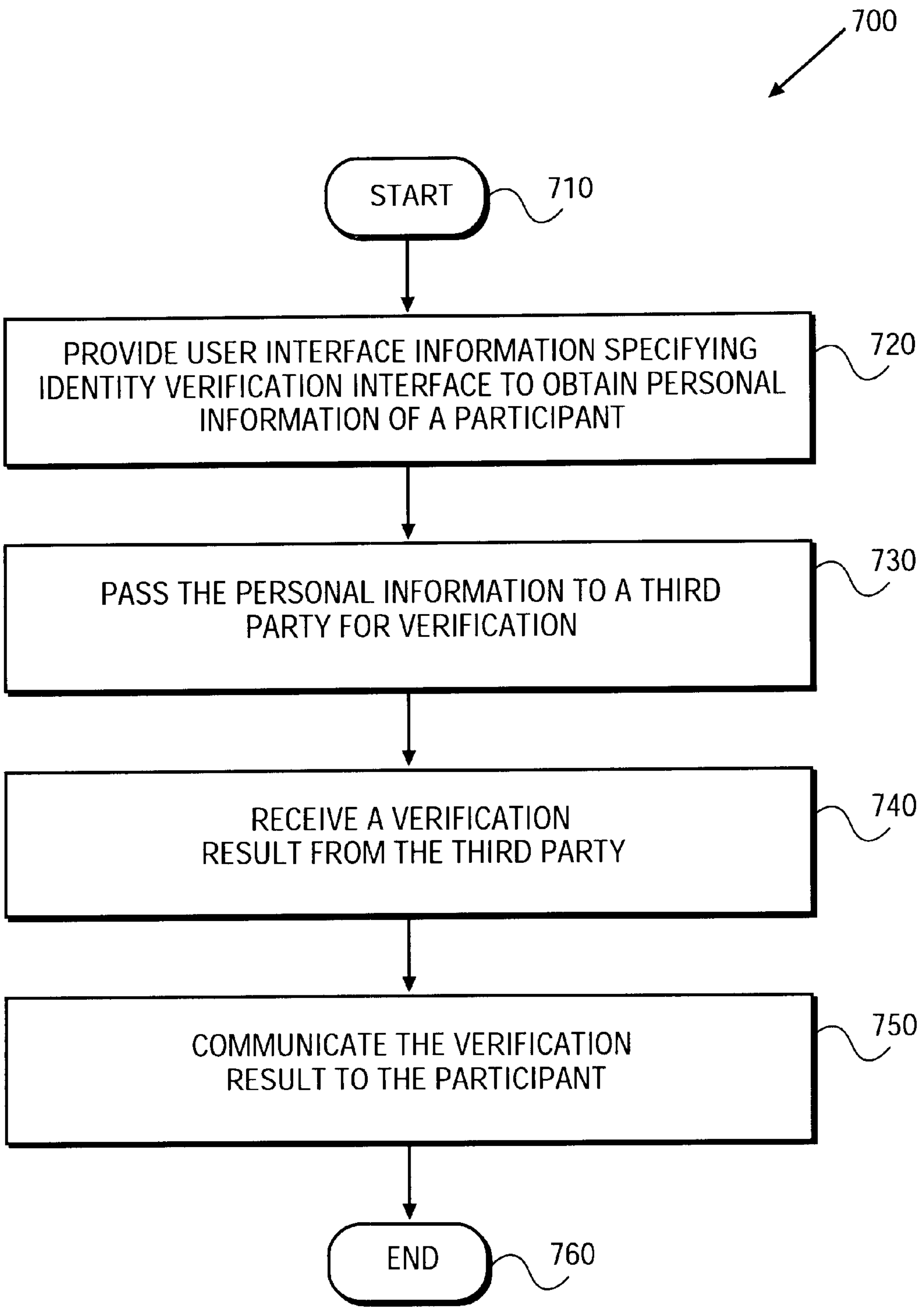
FIG. 7A is a flow chart of one embodiment for a method of verifying identity of a participant in a network-based transaction facility.

A method of verifying identity of a participant in a network-based transaction facility, such as the auction facility 10, will now be described as illustrated by the flow chart indicated in FIG. 7A. The method 700 commences with communicating user interface information to a participant of the transaction facility. Specifically, the user interface information provides a login interface 102, described above with reference to FIG. 6, which includes a user identifier field and password field into which a user may enter a user identifier and password to enable the login confirmation operation. In one embodiment, the login interface 102 may also require the participant's consent to being charged a certain fee for verifying his or her identity.

Subsequent to the login confirmation by the user, the user is provided with an identity verification interface for obtaining his or her personal information. In one embodiment, the personal information includes participant's contact information.

In one embodiment, the identity verification interface consists of two components: a preview user information interface 104 and a confirmation interface 105. The preview user information interface 104 illustrated in FIG. 8 provides personal information of the user that is currently stored in the user table 40 and the user information table 41. The user may update this information if it is inaccurate. The confirmation interface 105 illustrated in FIG. 9 urges the user to make additional changes if needed and to acknowledge that the personal information is correct and can be forwarded to a third party verifier.

At block 730, the personal information of the participant is passed to the third party verifier 108 via a communications network. In one embodiment, the personal information is passed using a Hypertext Transfer Protocol (HTTP) Post. As described above, the personal information is transferred in a particular format and in an encrypted form. The third party verifier 108 receives the personal information and proceeds with further questioning of the participant about financial and non-financial information that is known only to the participant. The questioning by the third party verifier 108 is integrated into the verification process initiated by the transaction facility such as the auction facility 10.

At block 740, a verification result is received from the third party verifier 108 via the communications network. In one embodiment, the verification result is received using the HTTP Post. As described above with respect to FIG. 12, the verification result is transferred in a particular format and in an encrypted form. In one embodiment, the "UserScore" object 126 decrypts the output set of data, checks the verification status information in the user table 40 to confirm that the user is currently participating in the verification process, and applies a fee for the verification process to the user's account if the user successfully passed the verification process. In addition, the "UserScore" object 126 updates the user's verification status in the user table 40 based on the verification result. In one embodiment, the third party verifier 108 determines whether the participant passed or failed the identity verification process. Alternatively, the transaction facility makes the final determination based on the information provided by the third party verifier 108.

At block 750, the verification result is communicated to the participant via the communications network. The verification result may include either congratulatory information or denial information. An exemplary verification result interface 300 with the congratulatory information is illustrated in FIG. 10. In one embodiment, upon receiving a denial result, the participant may be given an option to participate in a manual verification process. The manual verification process enables the participant to dispute the accuracy or completeness of information on which the verification process was based. In this embodiment, the participant is provided with a decline screen which serves as a fax cover sheet for the participant and includes a pre-printed personal identification number of the participant, the fax number of the third party verifier 108 and instructions as to the information that should be faxed to the third party verifier 108.

Figure 7B:
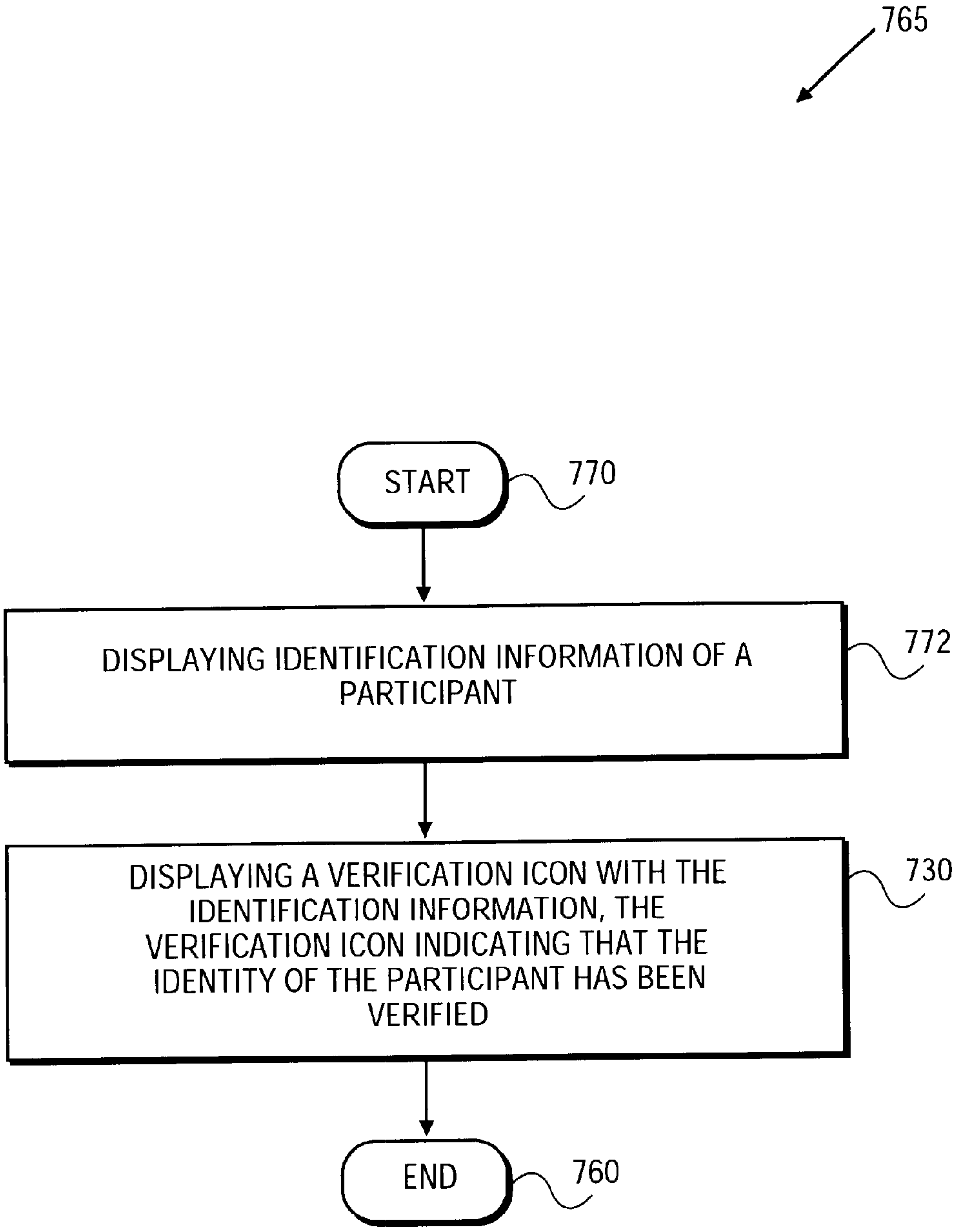
FIG. 7B is a flow chart of one embodiment for a method of displaying a user interface to verify identity of a participant in a computerized transaction facility.

A method of displaying a user interface to verify identity of a participant in a computerized transaction facility, such as the auction facility 10, will now be described as illustrated by the flow chart indicated in FIG. 7B. The method 765 commences with displaying identification information of the participant as shown at box 772. The identification information of the participant is displayed upon a request of another participant in the transaction facility. For example, a trader may request identification information of another trader before deciding whether to enter a transaction with the other trader. In one embodiment, the identification information may include a user identifier of the participant and feedback information associated with the participant.

At box 730, a verification icon is displayed with identification information of the participant. The verification icon indicates to others that the identity of this participant has been verified by a third party verifier. In one embodiment, the verification by the third party verifier is performed using an online verification process. Alternatively, the verification is performed using a postal mailing verification process. Both processes are described in more detail above.

FIG. 11 illustrates an exemplary user interface 350 which displays a user identifier 354, a verification icon 352 and a feedback profile of the participant. In one embodiment (not shown), the verification icon 352 identifies a source of verification (e.g., a certain consumer credit reporting company) and a type of verification (e.g., based on financial information, non-financial information, etc.). The verification icon may expire upon a predetermined period of time and may be removed upon changing personal information by the participant.

In summary, it will be appreciated that the above described interfaces, and underlying technologies, provide a convenient vehicle for verifying the identity of a participant in a transaction facility using a seamlessly integrated, real-time process and for making a verification result readily available to other participants.

Figure 13:
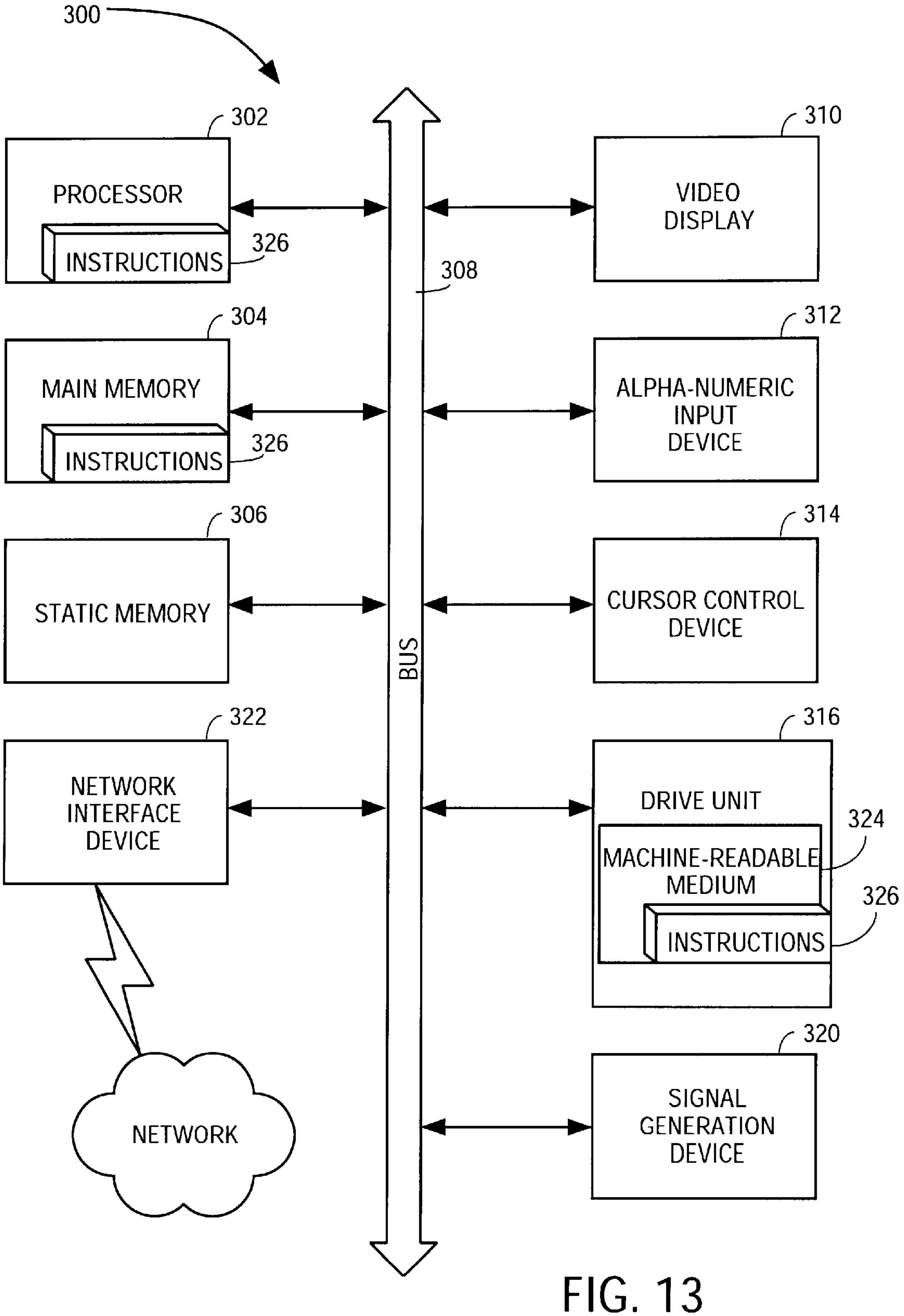
FIG. 13 is a block diagram of one embodiment of a computer system.

FIG. 13 shows a diagrammatic representation of machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g., a keyboard), a cursor control device 314 (e.g.,a mouse), a disk drive unit 316, a signal generation device 320 (e.g., a speaker) and a network interface device 322, The disk drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, a method and apparatus for verifying the identity of a participant in a network-based transaction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for verifying identity of a participant in a network-based transaction facility, the method comprising:

providing user interface information to the participant via a communications network, the user interface information specifying an identity verification interface for obtaining personal information of the participant;

passing the personal information of the participant to a third party for verification, the personal information being passed to the third party via the communications network;

receiving a verification result from the third party via the communications network;

communicating the verification result to the participant via the communications network; and making the verification result available to at least one of a plurality of further participants in the network-based transaction facility in response to a request from the least one of the plurality of further participants.

2. The method of claim 1 wherein the personal information is passed to the third party upon obtaining consent from the participant.

3. The method of claim 1 wherein the personal information is passed in an encrypted form.

4. The method of claim 1 further comprising charging a fee for verifying the identity of the participant.

5. The method of claim 1 wherein the identity verification interface communicates to the participant current personal information of the participant, enables the participant to modify the current personal information, and facilitates confirmation by the participant that the current personal information is correct.

6. The method of claim 1 wherein the personal information includes contact information of the participant.

7. The method of claim 1 wherein communicating the verification result includes communicating either confirmation information or denial information to the participant.

8. A method of displaying a user interface to verify identity of a participant in a computerized transaction facility, the method comprising:

displaying identification information of the participant to at least one of a plurality of further participants in the computerized transaction facility; and displaying a verification icon with the identification information, the verification icon indicating that the identity of the participant has been verified by a third party.

9. The method of claim 8 wherein the verification icon identifies a source and type of verification.

10. The method of claim 8 wherein the verification icon expires upon a predefined period of time.

11. The method of claim 8 wherein the third party verifies the identity of the participant based upon personal information of the participant.

12. The method of claim 11 further comprising removing the verification icon upon changing personal information by the participant.

13. The method of claim 11 wherein the third party receives the personal information via any one of a communications network and a postal mailing.

14. The method of claim 11 wherein the personal information includes contact information of the participant.

15. The method of claim 8 wherein the identification information includes a user identifier of the participant and feedback information associated with the participant.

16. A system for verifying identity of a participant in a network-based transaction facility, the system comprising:

a client computer to present user interface information specifying an identity verification interface for obtaining personal information of a user and to communicate personal information over a communications network;

a transaction computer, coupled to the client computer via a communications network, to implement a transaction system that facilitates transactions between the user and a further user, to receive the personal information from the client computer via the communications network, and to communicate the personal information over the communications network; and an identity verification computer, coupled to the transaction computer via the communications network, to receive the personal information from the transaction computer via the communications network, to perform an identity verification process to generate a verification result, and to communicate the verification result to the transaction computer over the communications network, wherein transaction computer makes the verification result available to the further user via the communications network and responsive to a request from the further user for information concerning the user.

17. A computer readable medium comprising instructions, which when executed on a processor, cause the processor to perform a method for verifying identity of a participant in a network-based transaction facility, the method comprising:

providing user interface information to the participant via a communications network, the user interface information specifying an identity verification interface for obtaining personal information of the participant;

passing the personal information of the participant to a third party for verification, the personal information being passed to the third party via the communications network;

receiving a verification result from the third party via the communications network;

communicating the verification result to the participant via the communications network; and making the verification result available to at least one of a plurality of further participants in the network-based transaction facility in response to a request from the least one of the plurality of further participants.

18. A computer readable medium comprising instructions, which when executed on a processor, cause the processor to perform a method for displaying a user interface to verify identity of a participant in a computerized transaction facility, the method comprising:

displaying identification information of the participant to at least one of a plurality of further participants in the computerized transaction facility; and displaying a verification icon with the identification information, the verification icon indicating that the identity of the participant has been verified by a third party.

* * * * *